US009268463B2

(12) United States Patent
Jung et al.

(10) Patent No.: US 9,268,463 B2
(45) Date of Patent: Feb. 23, 2016

(54) MOBILE TERMINAL AND CONTROL METHOD THEREOF

(71) Applicant: LG ELECTRONICS INC., Seoul (KR)

(72) Inventors: Hojae Jung, Seoul (KR); Juhyun Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/221,478

(22) Filed: Mar. 21, 2014

(65) Prior Publication Data

US 2014/0313143 A1    Oct. 23, 2014

(30) Foreign Application Priority Data

Apr. 18, 2013    (KR) .................. 10-2013-0043104

(51) Int. Cl.
   *G06F 3/041*    (2006.01)
   *G06F 3/0481*    (2013.01)
   *G06F 3/0488*    (2013.01)

(52) U.S. Cl.
   CPC ............ *G06F 3/04817* (2013.01); *G06F 3/041* (2013.01); *G06F 3/0488* (2013.01); *G06F 2203/04803* (2013.01)

(58) Field of Classification Search
   CPC combination set(s) only.
   See application file for complete search history.

(56) References Cited

U.S. PATENT DOCUMENTS

| 8,560,959 | B2 * | 10/2013 | Zaman et al. ................. 715/765 |
| 8,782,544 | B2 * | 7/2014 | Hibi ............................. 715/765 |
| 9,052,820 | B2 * | 6/2015 | Jarrett et al. |
| 2010/0274858 | A1 | 10/2010 | Lindberg et al. |
| 2011/0175930 | A1 * | 7/2011 | Hwang et al. ................. 345/629 |
| 2012/0289290 | A1 | 11/2012 | Chae et al. |

OTHER PUBLICATIONS

European Search Report issued in related Application No. 14160831.5 dated Sep. 30, 2014.

* cited by examiner

*Primary Examiner* — Van Chow
(74) *Attorney, Agent, or Firm* — Ked & Associates, LLP

(57) ABSTRACT

Provided is a mobile terminal that includes a touch screen formed to enable a touch input, and a controller configured to generate a plurality of screen regions dividing the touch screen in which the touch screen is divided into a plurality of screen regions, and determine whether or not to display an icon in a first screen region based on whether or not the execution screen of a preset application is displayed in a second screen region among the plurality of screen regions, wherein the icon is an icon corresponding to a function of controlling the execution screen of the preset application displayed in the second screen region based on the execution screen of an application displayed in the first screen region.

20 Claims, 18 Drawing Sheets

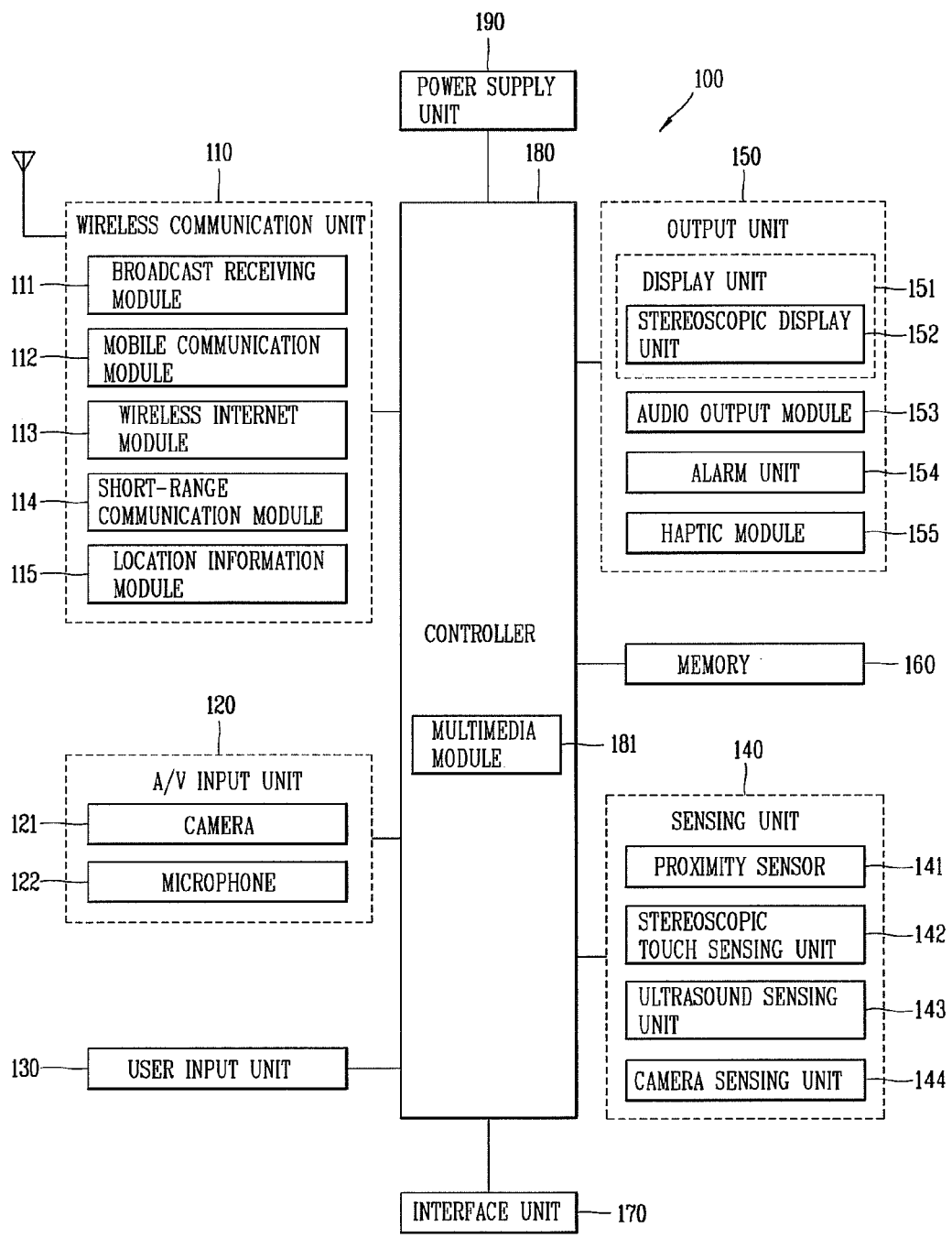

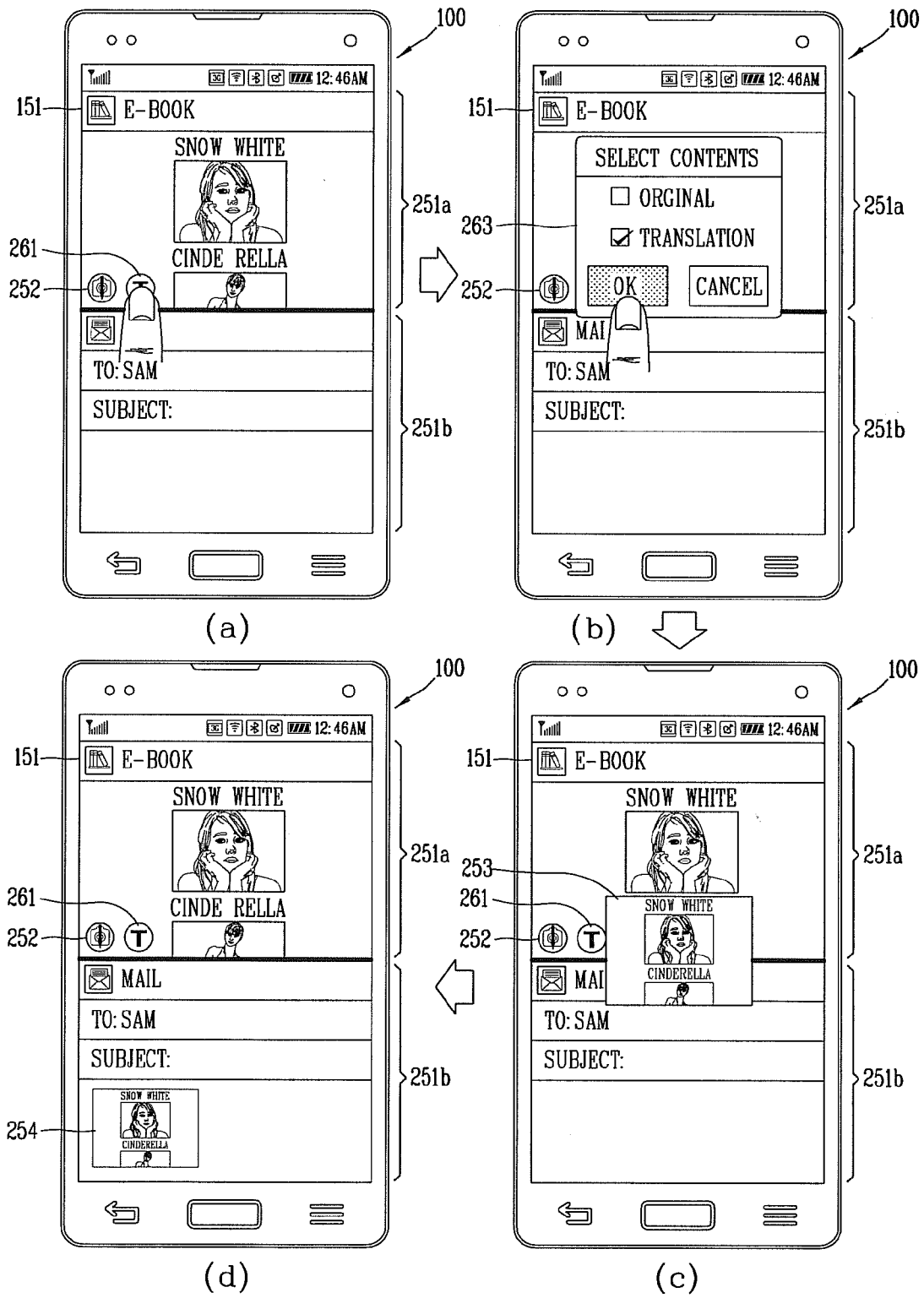

MOBILE TERMINAL AND CONTROL METHOD THEREOF

CROSS-REFERENCE TO RELATED APPLICATION(S)

This application claims priority under 35 U.S.C. §119 to Korean Patent Application No. 10-2013-0043104, filed on Apr. 18, 2013, whose entire disclosure is hereby incorporated by reference.

BACKGROUND

1. Field

The present disclosure relates to a mobile terminal, and more particularly, to a mobile terminal capable of dividing a screen and a control method thereof.

2. Background

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, the improvement of structural or software elements of the terminal may be taken into consideration to support and enhance the functions of the terminal.

Owing to the enhancement, mobile terminals having a multi-tasking function that simultaneously performs a plurality of applications have been produced in a large quantity. Accordingly, the interest on a screen division method of a mobile terminal capable of simultaneously displaying the execution screens of a plurality of applications running on multitasking has been increased. However, when it is desired to capture only screen information displayed in a first screen region in a split screen state, there has been inconvenience that the user captures the entire region of the screen information and then has to edit a portion corresponding to the first screen region.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 1 is a block diagram illustrating a mobile terminal according to an embodiment disclosed in the present disclosure;

FIGS. 16 through 18 are conceptual views illustrating an embodiment in which text data displayed in the first screen region is translated and appended to the execution screen of an application being executed in the second screen region.

DETAILED DESCRIPTION

Figure 2A:
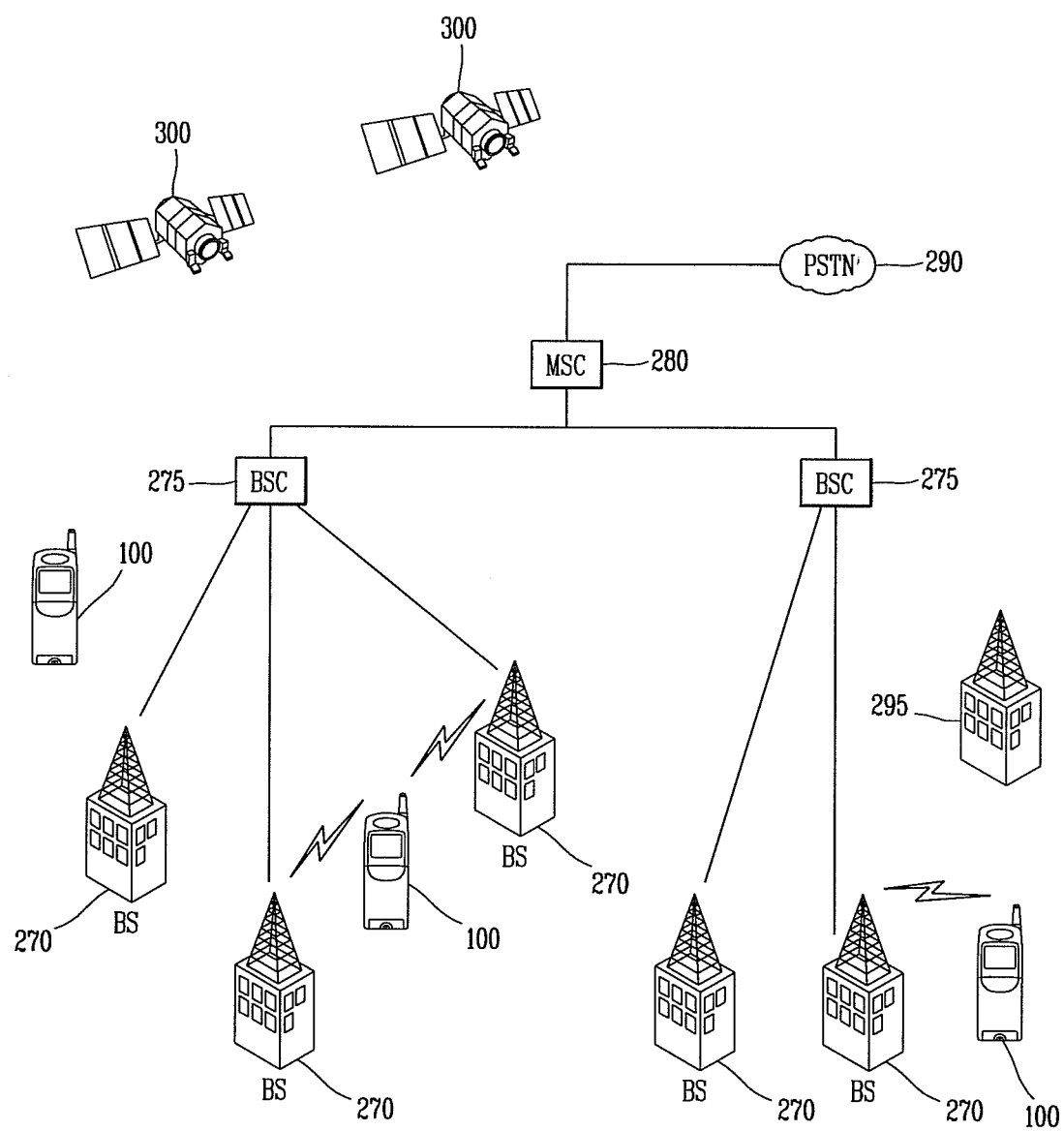
FIGS. 2A and 2B are conceptual views illustrating a communication system in which a mobile terminal according to the present disclosure is operable.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the disclosure pertains is judged to obscure the gist of the present disclosure.

A mobile terminal disclosed herein may include a portable phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement an video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (WiFI) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

Furthermore, the display unit 151 may be configured with a stereoscopic display unit 152 for displaying a stereoscopic image.

Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit (not shown). The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, a ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound.

For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor.

For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

For another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153 the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the user's control command input to applications when the state of the mobile terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Next, a communication system that can be implemented through the mobile terminal 100 according to the present disclosure will be described.

Figure 2B:
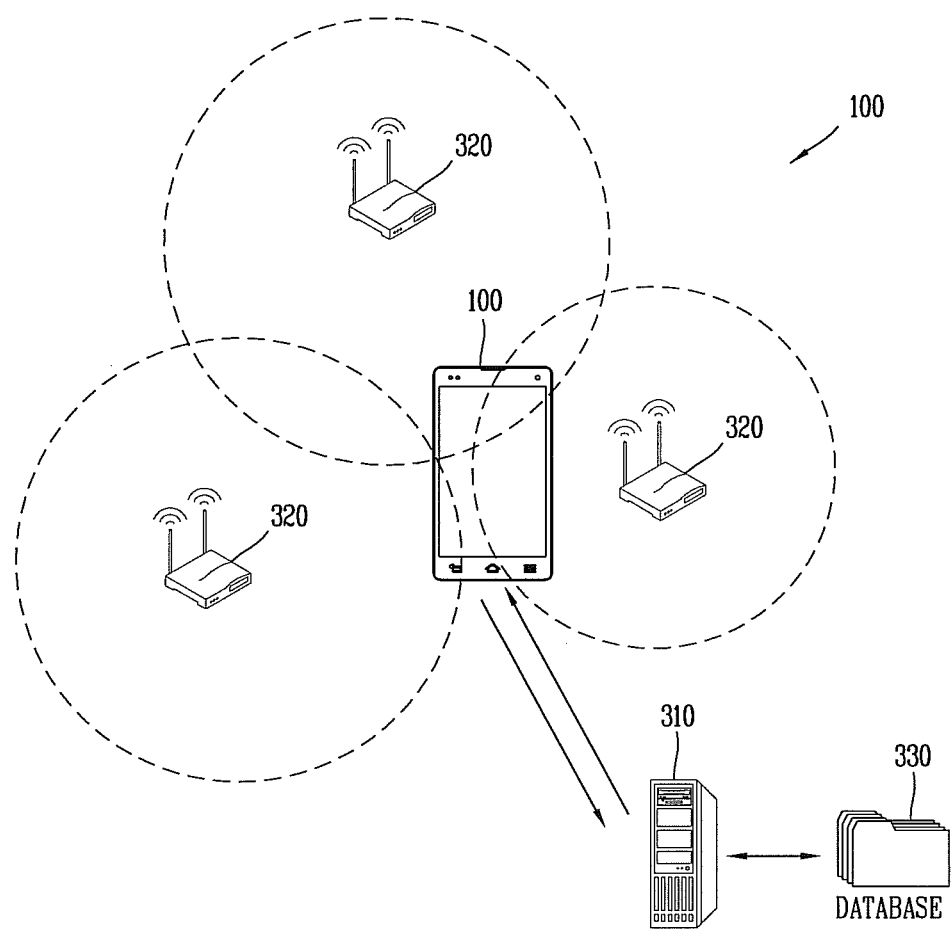

FIGS. 2A and 2B are conceptual views illustrating a communication system in which a mobile terminal 100 according to the present disclosure is operable.

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, it is apparent that the present disclosure may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this case, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, the mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Hereinafter, a mobile terminal according to an embodiment of the present disclosure as illustrated in FIG. 1 or a mobile terminal disposed with the constituent elements of the mobile terminal or the structure of a mobile terminal will be described.

Figure 3A:
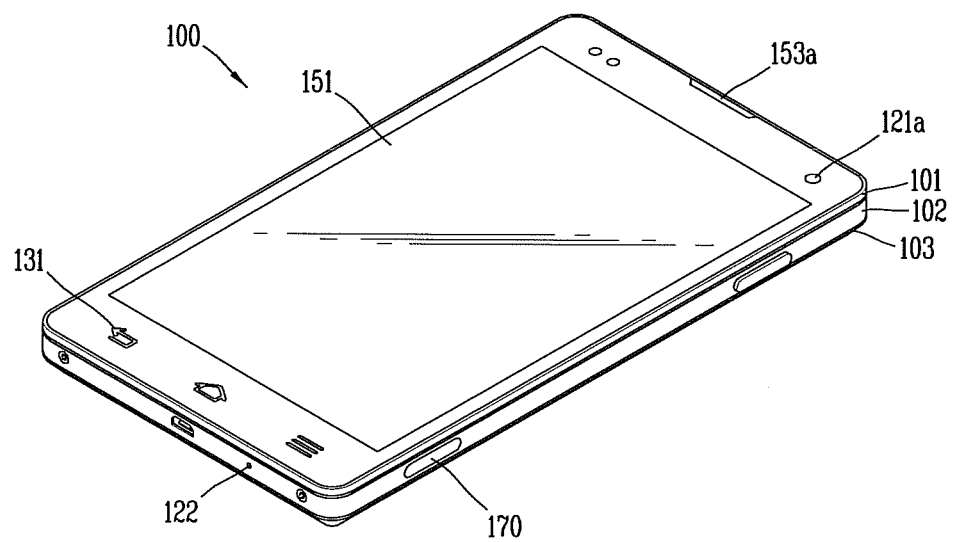
FIG. 3A is a front perspective view illustrating an example of a mobile terminal associated with the present disclosure.

FIG. 3A is a front perspective view illustrating an example of the mobile terminal 100 associated with the present disclosure.

The mobile terminal 100 disclosed herein is provided with a bar-type terminal body. However, the present disclosure may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. 3B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present disclosure may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
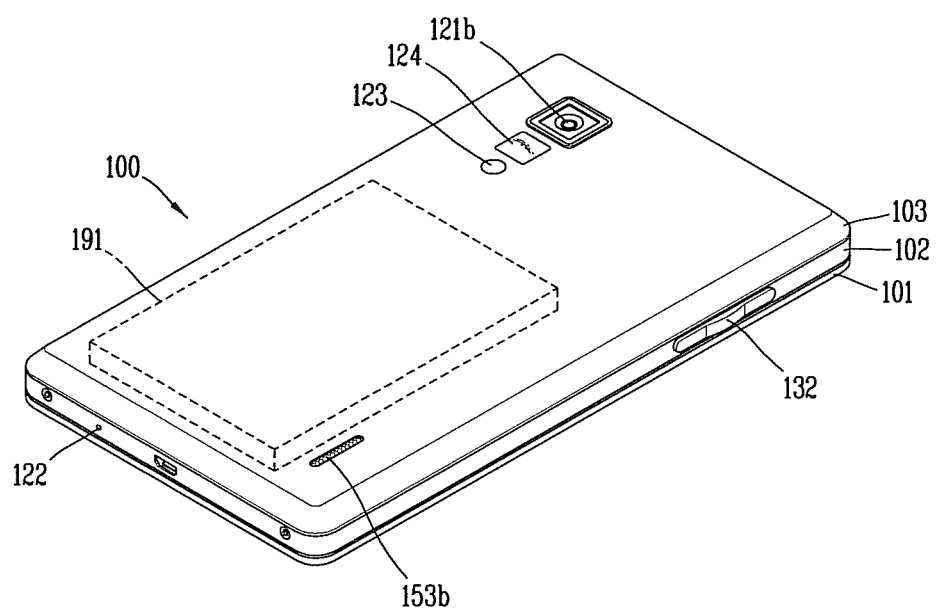
FIG. 3B is a rear perspective view illustrating a mobile terminal illustrated in FIG. 3A.

FIG. 3B is a rear perspective view illustrating mobile terminal 100 illustrated in FIG. 3A.

Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

According to an embodiment of the present disclosure, the foregoing mobile terminal 100 may perform a multi-tasking function. In this specification, the term "multi-tasking" denotes a plurality of applications being executed at the same time. The plurality of applications may be independent applications which are not applications linked to one another. In other words, multi-tasking does not denote limiting to being annexed or supplemented to any one application but denotes allowing many separate applications having the same level to be executed at the same time. Here, the application may refer to any one of an online service, a message function, a phone call function, a camera function and various additional functions such as video or music file reproduction.

The term an application "being carried out" or "being executed" denotes the state of an application prior to being completed after being executed, and the term "activation" of an application denotes a state in which an application being executed is displayed in the foreground of the display unit other than in the background thereof. On the contrary, the term "deactivation" of an application denotes a state in which an application being executed is displayed in the background of the display unit other than in the foreground thereof.

On the other hand, the interest on a screen division method of the mobile terminal 100 capable of simultaneously displaying the execution screens of a plurality of applications running on multitasking has been increased. However, when it is desired to capture only screen information displayed in a first screen region in a split screen state, there has been inconvenience that the user captures the entire region of the screen information and then has to edit a portion corresponding to the first screen region.

Accordingly, a mobile terminal 100 and a control method thereof capable of capturing a partial region of screen information in a split screen state will be described below with reference to the accompanying drawings.

Figure 4:
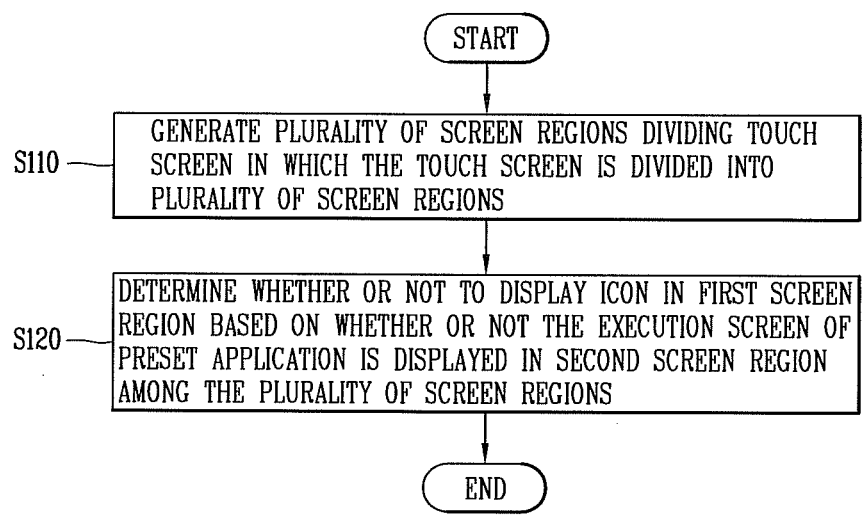
FIG. 4 is a flow chart for explaining a mobile terminal according to an embodiment of the present disclosure.

FIG. 4 is a flow chart for explaining the mobile terminal 100 (refer to FIG. 1) according to an embodiment of the present disclosure. The mobile terminal 100 may include a display unit 151 (refer to FIG. 1) and a controller 180 (refer to FIG. 1).

Referring to FIG. 4, first, the process (S110) of generating a plurality of screen regions dividing the display unit in which the display unit 151 is divided into a plurality of screen regions is carried out. The plurality of screen regions may be generated based on an input, for example, a touch input on the touch screen, a designated button or the like. Moreover, the plurality of screen regions may be generated when operating in a split screen mode (also split mode).

Specifically, the sensing unit 140 (refer to FIG. 1) may sense a control command (hereinafter, referred to as a "split screen command") for implementing the function of dividing a screen displayed on the display unit 151 into a plurality of regions. For example, when at least one of the first and the second manipulation unit 131, 132 (refer to FIGS. 2A and 2B) provided on a front surface of the body of the mobile terminal 100 is selected, the split screen command may be sensed.

The controller 180 may configure a first and a second screen region displayed on the display unit 151 based on the sensed split screen command. As illustrated in the drawing, the first and the second screen region may correspond to an upper and a lower region, respectively, generated by dividing an entire screen region of the display unit 151 in the horizontal direction.

Furthermore, the first and the second screen region may correspond to a left and a right region, respectively, generated by dividing an entire screen region of the display unit 151 in the vertical direction. Meanwhile, the number of regions displayed at the same time may not be necessarily limited to this, and may be modified in various ways. Furthermore, the first and the second screen region are formed to be individually scrolled.

The controller 180 may display the execution screens of the first and the second application running on multitasking in the first and the second screen region, respectively.

Then, the process (S120) of determining whether or not to display an icon in the first screen region based on whether or not the execution screen of a preset application is displayed in the second screen region among the plurality of screen regions is carried out.

Specifically, when the execution screen of an application capable of performing a function of appending content as a preset application is displayed in the second screen region, the controller 180 may display an icon in the first screen region. The application capable of performing a function of appending content may include at least one of an email application, a message application, a messenger application and a social network service (SNS) application.

Here, the icon denotes an icon corresponding to a function of controlling the execution screen of the preset application displayed in the second screen region using the execution screen of an application displayed in the first screen region. Moreover, the icon may further include at least one of a second icon corresponding to a function of transmitting a content file being executed in the first screen region and a third icon corresponding to a function of translating text data displayed in the first screen region.

On the contrary, when the execution screen of another application other than the preset application is displayed in the second screen region, the controller 180 may not display an icon in the first screen region.

Figure 5:
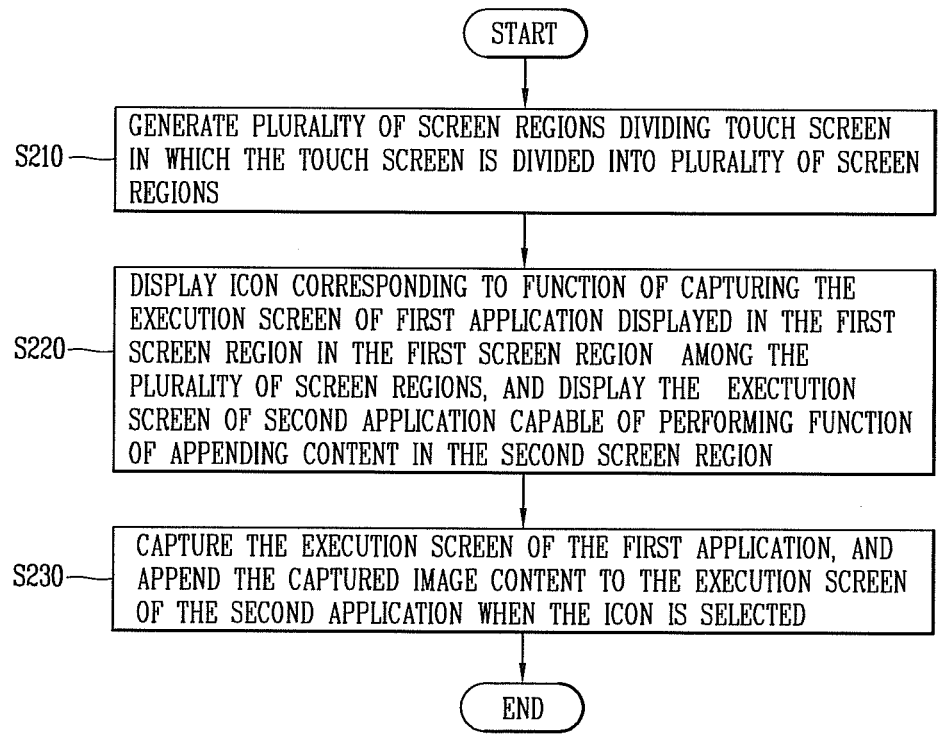
FIG. 5 is a flow chart for explaining a specific embodiment of a mobile terminal according to the present disclosure.

FIG. 5 is a flow chart for explaining a specific embodiment of the mobile terminal 100 according to the present disclosure. The mobile terminal 100 may include a display unit 151 (refer to FIG. 1) and a controller 180 (refer to FIG. 1). Hereinafter, the foregoing description will be omitted with reference to the description of FIG. 4.

Referring to FIG. 5, first, the process (S210) of generating a plurality of screen regions dividing the display unit 151 in which the display unit 151 is divided into a plurality of screen regions is carried out. The plurality of screen regions may be generated based on an input, for example, a touch input on the touch screen, a designated button or the like. Moreover, the plurality of screen regions may be generated when operating in a split screen mode (or split mode).

Next, the process (S220) of displaying an icon corresponding to a function of capturing the execution screen of a first application displayed in the first screen region in the first screen region among the plurality of screen regions, and displaying the execution screen of a second application capable of performing a function of appending content in the second screen region is carried out.

The execution screen of a second application may be displayed in the second screen region. Here, the second application denotes an application capable of performing a function of appending content. The second application may include at least one of an email application, a message application, a messenger application and a social network service (SNS) application.

The execution screen of a first application may be displayed in the first screen region. The controller 180 may display an icon corresponding to a function of capturing the execution screen of a first application on the first screen region. The color, shape, transparency and 3D depth value of an icon can vary based on a touch input sensed on the icon. Furthermore, the location of an icon within the first screen region can vary based on a touch input sensed on the icon.

Then, when the icon is selected, the process (S230) of capturing the execution screen of the first application, and appending the captured image content to the execution screen of the second application is carried out.

When an icon displayed in the first screen region is selected, the controller 180 may capture the execution screen of a first application displayed in the first screen region. The controller 180 may append the captured image content to the execution screen of a second application.

At this time, the controller 180 may display the captured image content to be overlapped with the first screen region for a preset period of time, thereby showing that the execution screen of the first application has been captured. Moreover, the controller 180 may provide an effect of moving the captured image content from the first screen region to the second screen region, thereby showing that the captured image content has been appended to the execution screen of the second application.

On the other hand, the controller 180 may append additional information (for example, webpage address, text data, etc.) associated with the execution screen of the first application displayed in the first screen region to the execution screen of the second application. To this end, the controller 180 may display a popup window for selecting which one of the additional information is to be appended on the display unit 151.

As described above, according to the present disclosure, in a state that the display unit 151 is divided into a first and a second screen region, either one of the first and the second screen region can be captured. Accordingly, even though the user captures screen information displayed in the entire region of the display unit 151 and then he or she does not additionally edit the captured image, the user's desired region can be immediately captured. In other words, a complicated process for capturing a partial region of the screen information may be omitted. As a result, the user can more conveniently manage the resources of the mobile terminal 100 such as memory, power, and the like, which are required to capture a partial region of the screen information.

Figure 6:
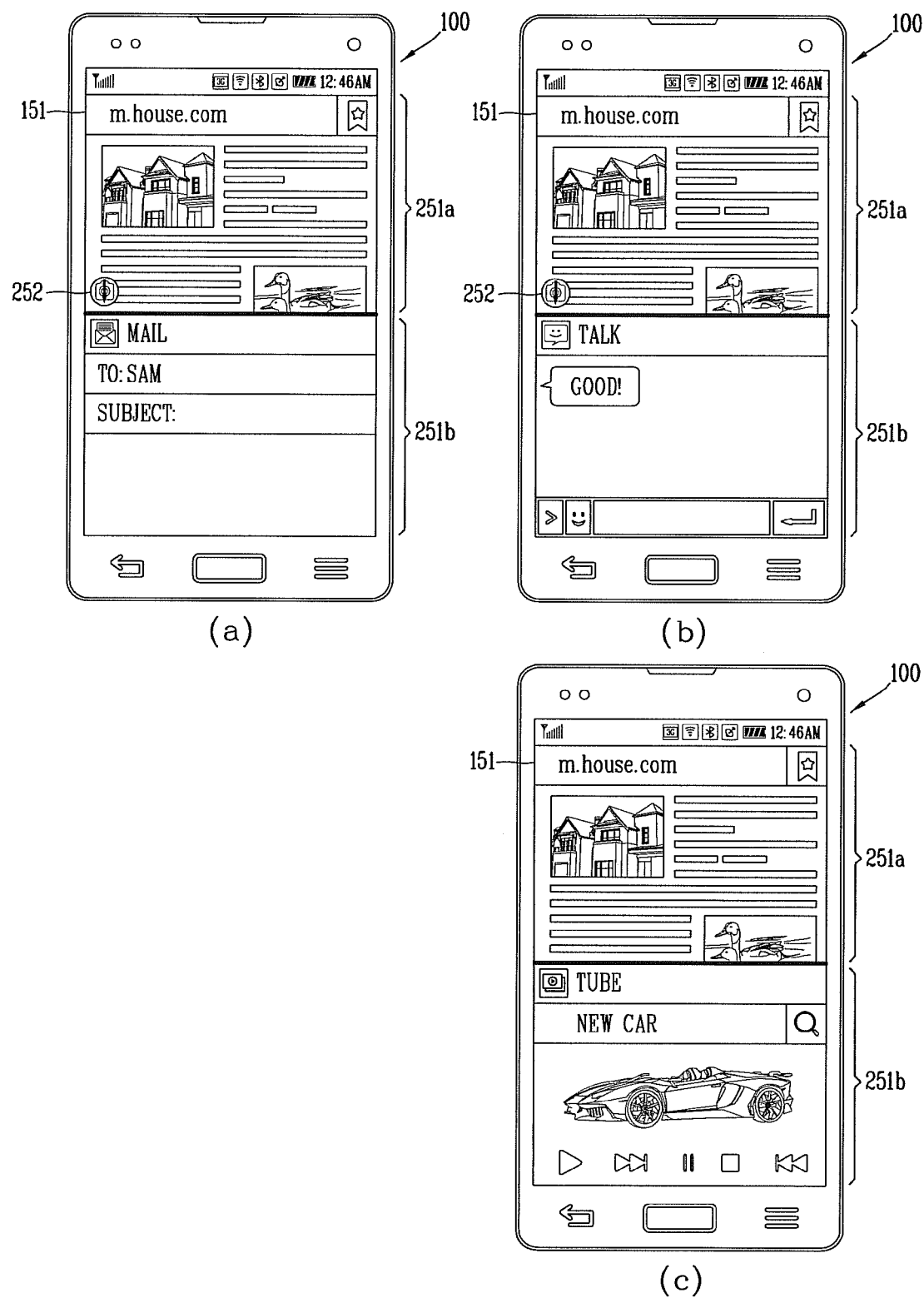
FIG. 6 is a conceptual view illustrating an embodiment in which an icon is displayed in a first screen region based on the kind of an application being executed in a second screen region.

FIG. 6 is a conceptual view illustrating an embodiment in which an icon is displayed in the first screen region 251*a* based on the kind of an application being executed in the second screen region 251*b*.

Referring to FIG. 6, the display unit 151 may include a plurality of screen regions (hereinafter, referred to as "a first and a second screen region") 251*a*, 251*b*. The first and the second screen region 251*a*, 251*b* may display the execution screen of the first and the second application running on multitasking, respectively.

Though an Internet application is illustrated as the first application in the drawing, the first application may be various applications. For example, the first application may include a map application, a music play application, an ebook application, and the like.

The controller 180 may determine whether or not to display an icon in the first screen region 251*a* based on whether or not the execution screen of a preset application is displayed in the second screen region 251*b*. Here, the preset application may include an application capable of performing the function of appending content.

The icon denotes an icon corresponding to a function of controlling the execution screen of the preset application displayed in the second screen region using the execution screen of an application displayed in the first screen region. The icon may include an icon corresponding to a function of capturing the execution screen of an application displayed in the first screen region.

Accordingly, as illustrated in FIG. 6A, when the execution screen of an email application capable of transmitting an email appended with content to the counterpart is displayed in the second screen region 251*b*, the controller 180 may display an icon in the first screen region 251*a*.

Similarly, as illustrated in FIG. 6B, when the execution screen of a message application capable of transmitting a message containing content to the counterpart is displayed in the second screen region 251*b*, the controller 180 may display an icon in the first screen region 251*a*.

On the other hand, as illustrated in FIG. 6C, when a video application is displayed in the second screen region 251*b*, the controller 180 may not display an icon in the first screen region 251*a*.

Figure 7:
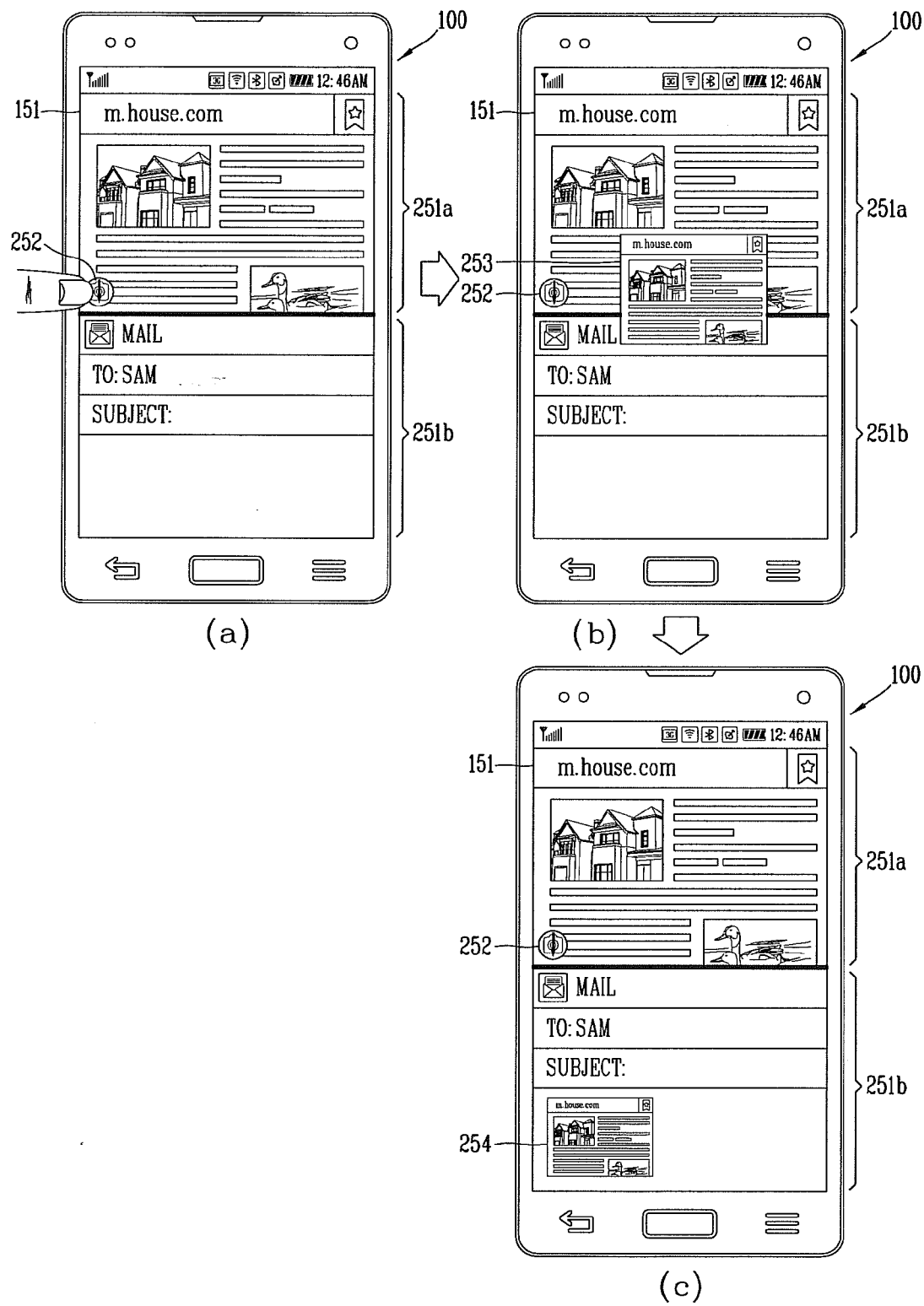
FIGS. 7 and 8 are conceptual views illustrating an embodiment in which the execution screen of an application displayed in the first screen region is captured and appended to the execution screen of an application being executed in the second screen region.
Figure 8:
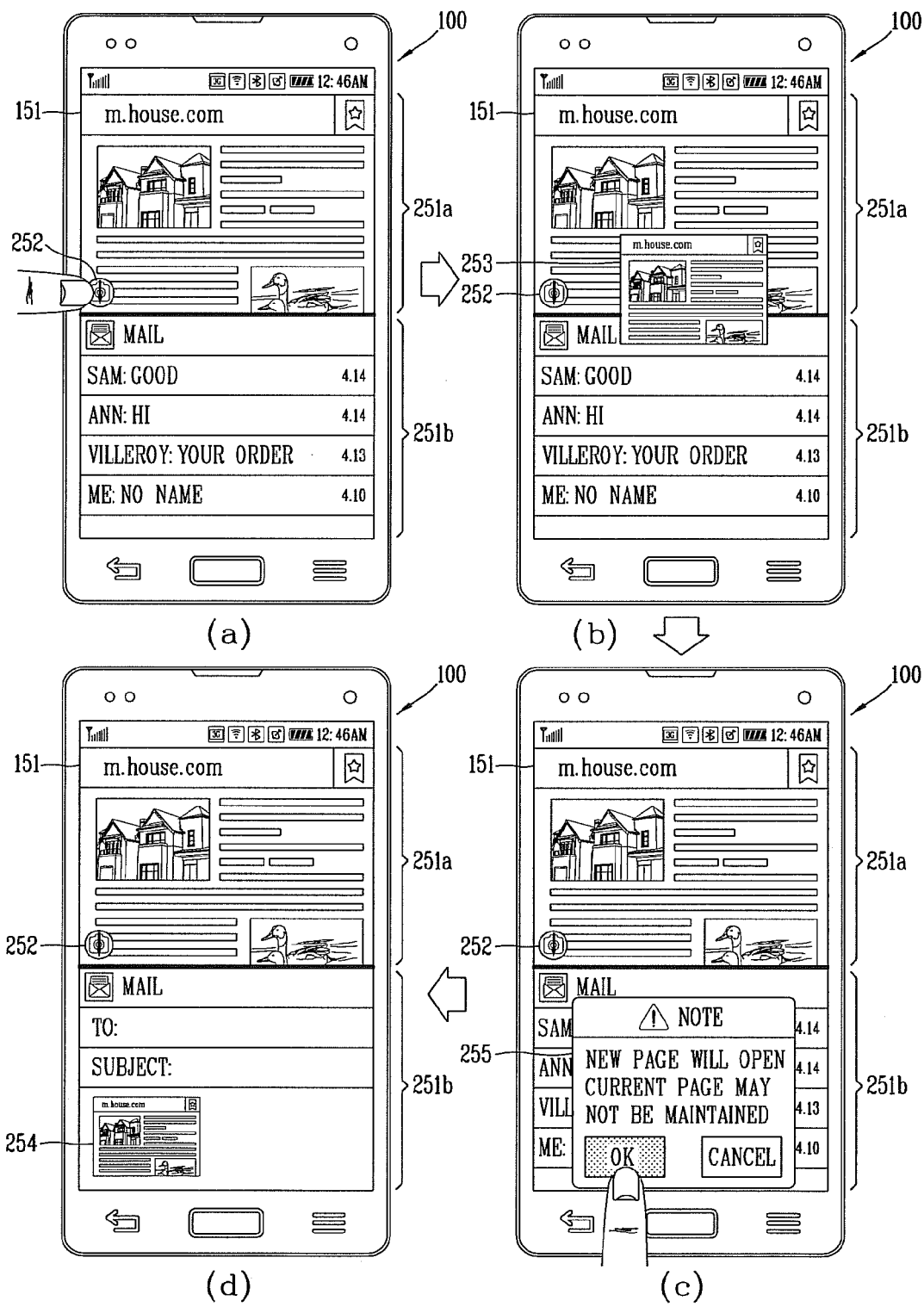

FIGS. 7 and 8 are conceptual views illustrating an embodiment in which the execution screen of an application displayed in the first screen region is captured and appended to the execution screen of an application being executed in the second screen region 251*b*.

Referring to FIG. 7A, the execution screen of a first application (for example, Internet application) may be displayed in the first screen region 251*a* of the display unit 151 and the execution screen of a second application (for example, email application) may be displayed in the second screen region 251*b*. Specifically, a content input screen (hereinafter, referred to as an "email input screen") capable of immediately performing the function of appending captured image content may be displayed in the second screen region 251*b*. At this time, the controller 180 may display an icon 252 corresponding to a function of capturing the execution screen of the first application in the first screen region 251*a*.

Referring to FIGS. 7B and 7C, when a touch input is sensed on the icon 252, the controller 180 may capture the execution screen of an Internet application, and append the captured image content 253 to the email input screen displayed in the second screen region 251*b*.

As illustrated in FIG. 7B, upon capturing the execution screen of the Internet application, the captured image content 253 may be displayed to be overlapped with the first screen region 251*a* for a preset period of time. The controller 180 may provide an effect of moving the captured image content 253 from the first screen region 251*a* to the second screen region 251*b*. Though not shown in the drawing, the controller 180 may display the execution screen of the Internet application displayed in the first screen region 251*a* in a dim tone while providing the effect of moving the captured image content 253 from the first screen region 251*a* to the second screen region 251*b*.

Then, as illustrated in FIG. 7C, the controller 180 may append the captured image content 253 to the email input screen. The controller 180 may display an object 254 indicating that the captured image content has been appended in the email input screen. As illustrated in the drawing, the object 254 may include thumbnail image data corresponding to the captured image content. Though not shown in the drawing, the object 254 may include text data informing that the captured image content has been appended.

Then, though not shown in the drawing, when an icon corresponding to a function of transmitting content displayed in the email input screen is selected, the controller 180 may transmit an email containing the captured image content to the counterpart.

On the other hand, referring to FIG. 8A, a list of emails may be displayed as the execution screen of an email application in the second screen region 251*b*. In this case, when a touch input is sensed on the icon 252, as illustrated in FIG. 8B, the controller 180 may capture the execution screen of the Internet application, and display the captured image content 253 to be overlapped with the first screen region 251*a* for a preset period of time.

At this time, referring to FIG. 8C, the controller 180 may display a popup window 255 for selecting whether or not to display an email input screen to append the captured image content to the email input screen.

At this time, when it is selected on the popup window 255 that the email input screen is to be displayed, referring to FIG. 8D, the controller 180 may display the list of emails that has been displayed in the second screen region 251b to be switched to the email input screen. The controller 180 may display an object 254 indicating that the captured image content has been captured on the email input screen.

On the other hand, though not shown in the drawing, when it is selected on the popup window 255 that the email input screen is not to be displayed, the controller 180 may continue to display the list of emails in the second screen region 251b. Accordingly, the controller 180 does not perform the operation of appending the captured image content 253.

Figure 9:
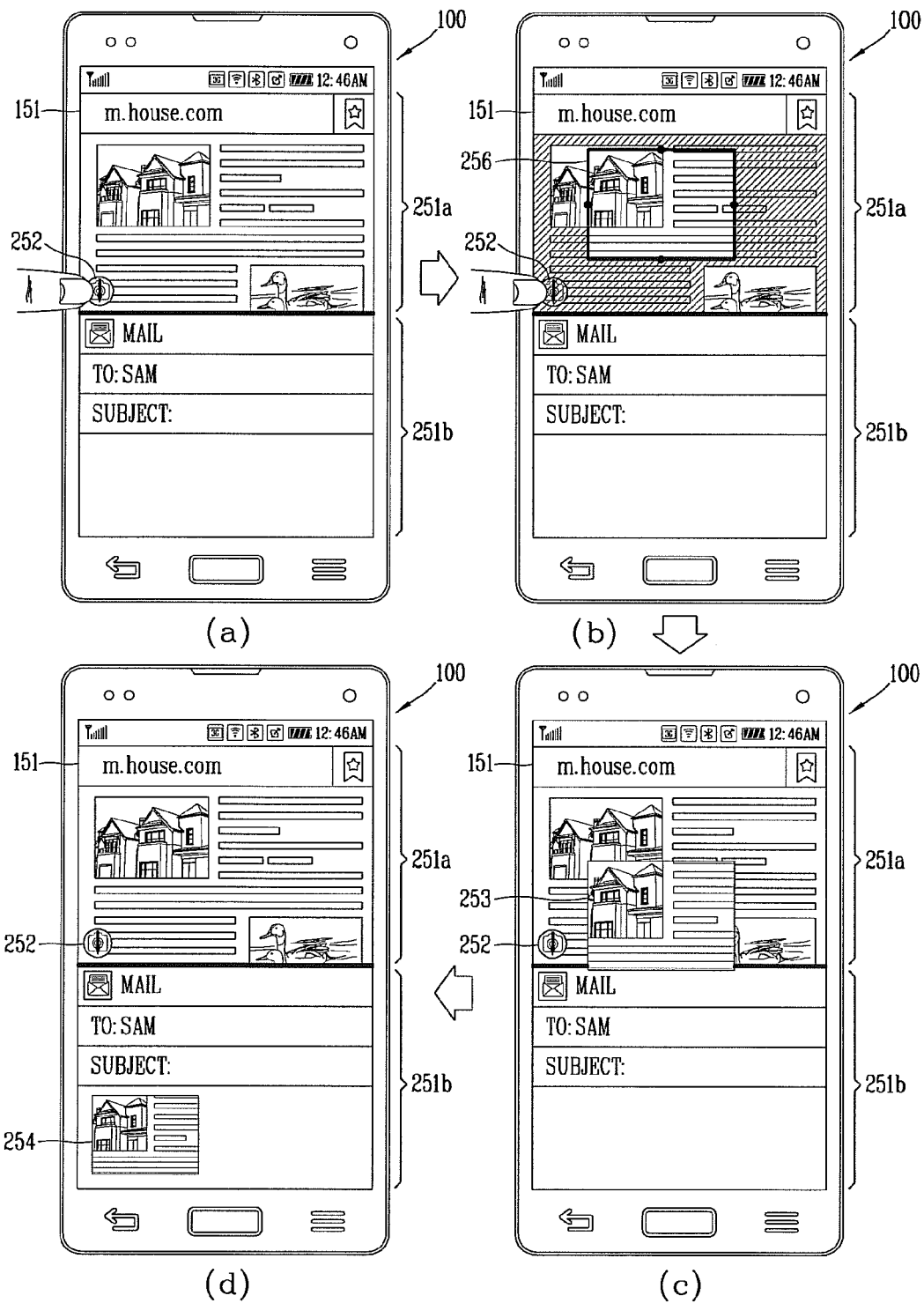
FIGS. 9 and 10 are conceptual views illustrating an embodiment in which image content for capturing the execution screen of an application displayed in the first screen region is edited.
Figure 10:
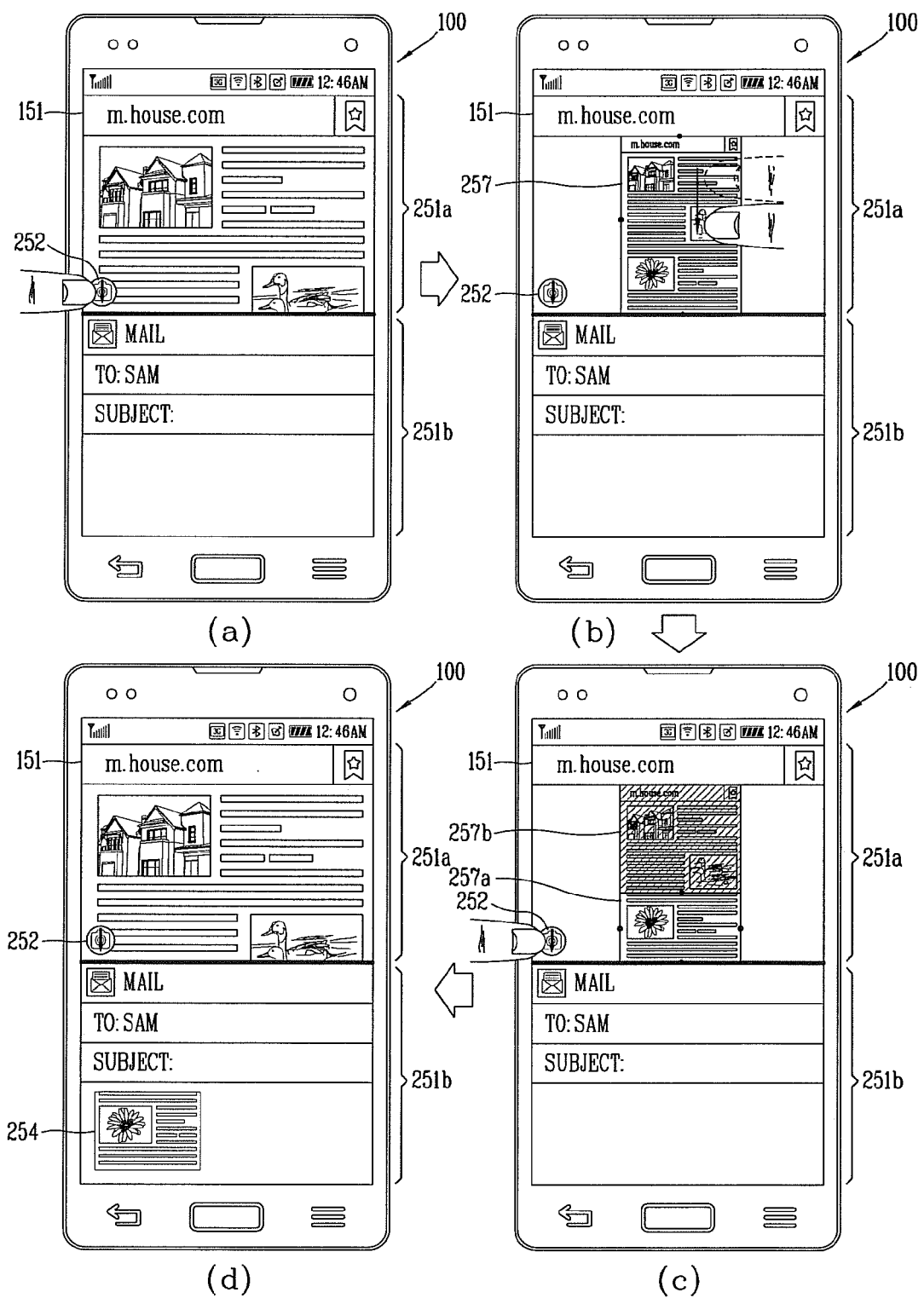

FIGS. 9 and 10 are conceptual views illustrating an embodiment in which image content for capturing the execution screen of an application displayed in the first screen region 251a is edited.

As described above, when a first touch input (for example, short touch input) is sensed on the icon 252 displayed in the first screen region 251a, the controller 180 may capture the execution screen of an Internet application displayed in the first screen region 251a.

On the other hand, referring to FIG. 9A, when a second touch input (for example, long touch input) which is different from the first touch input is sensed on the icon 252 displayed in the first screen region 251a, the controller 180 may capture the execution screen of the Internet application displayed in the first screen region 251a, and execute an edit mode for editing the captured image content as illustrated in FIG. 9B.

At this time, though not shown in the drawing, when at least one of the first and the second manipulation unit 131, 132 provided on a front surface of the body of the mobile terminal 100 is selected, the controller 180 may terminate the edit mode.

The controller 180 may display the captured image content in the first screen region 251a and display a regional boundary line 256 for selecting a region to be cut from the captured image content. The controller 180 may adjust at least one of the location and size of a region to be cut based on a touch input sensed on the regional boundary line 256. As illustrated in the drawing, a portion out of the regional boundary line 256 may be displayed to be distinguished from a portion within the regional boundary line 256 in the captured image content. For example, the portion out of the regional boundary line 256 may be displayed in a dim tone.

Then, when a touch input is sensed on the icon 252, as illustrated in FIGS. 9C and 9D, the controller 180 may terminate the edit mode, and append the edited image content 253 to the email input screen displayed in the second screen region 251b. Accordingly, thumbnail image data 254 corresponding to the edited image content 253 may be displayed on the email input screen.

Though not shown in the drawing, when the icon 252 is selected, the controller 180 may first select which portion to be captured from the execution screen of the Internet application displayed in the first screen region 251a. Then, the controller 180 may capture the selected portion of the execution screen of the Internet application, and append the captured image content to the email input screen displayed in the second screen region 251b.

On the other hand, referring to FIG. 10A, when a second touch input (for example, long touch input) which is different from the first touch input is sensed on the icon 252 displayed in the first screen region 251a, the controller 180 may capture an entire page containing the execution screen of the Internet application displayed in the first screen region 251a, and execute an edit mode for editing the captured image content as illustrated in FIG. 10B.

At this time, as illustrated in FIGS. 10B and 10C, the controller 180 may display image content 257 that has captured the entire page in the first screen region 251a, and select a region to be cut from the captured image content 257. The controller 180 may adjust at least one of the location and size of a region to be cut based on a touch input sensed on the captured image content 257.

Then, when a touch input is sensed on the icon 252, as illustrated in FIG. 10D, the controller 180 may terminate the edit mode, and append the edited image content to the email input screen displayed in the second screen region 251b. Accordingly, thumbnail image data 254 corresponding to the edited image content may be displayed in the email input screen.

Figure 11:
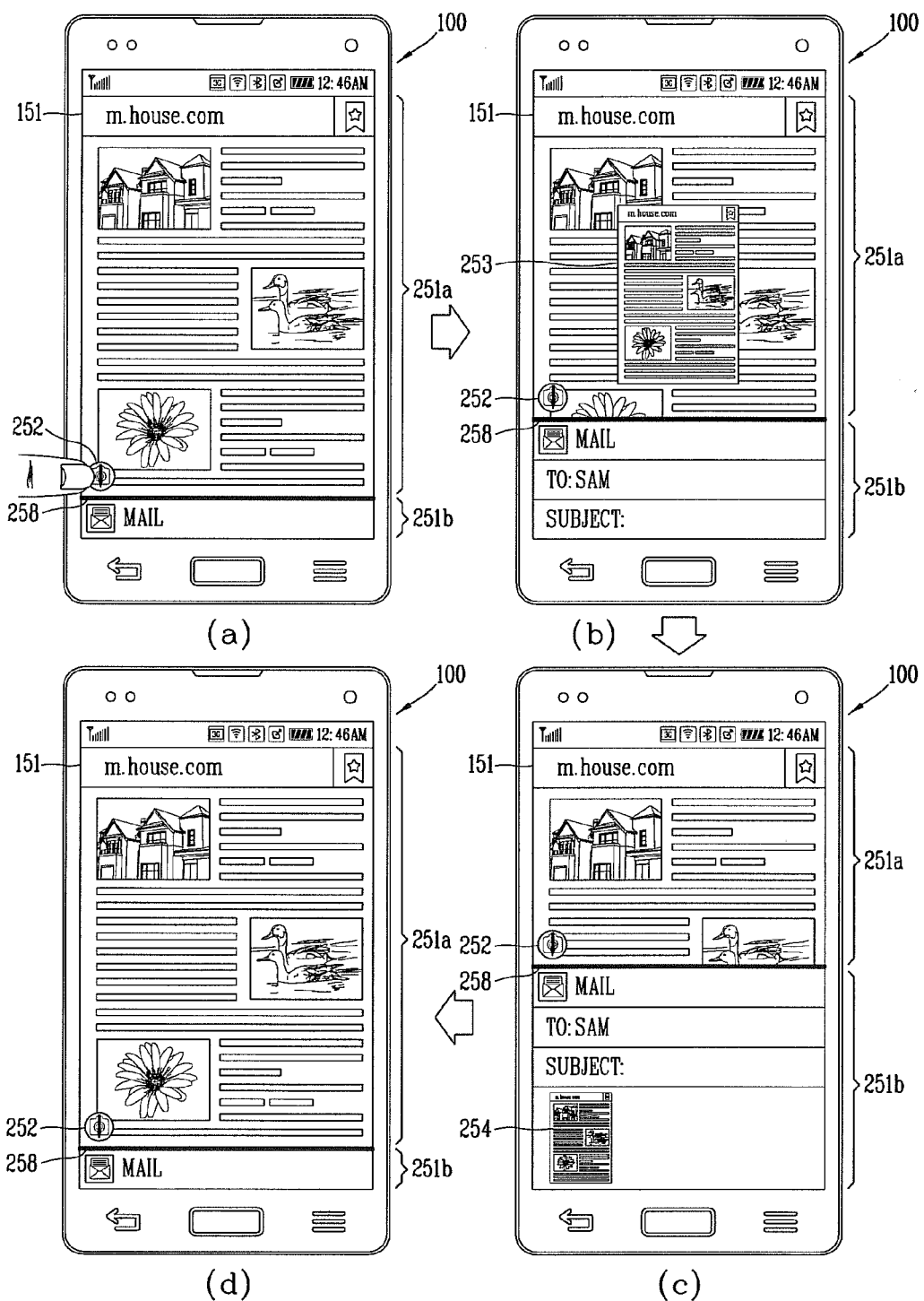
FIG. 11 is a conceptual view illustrating an embodiment in which the size of the second screen region is changed when the execution screen of an application displayed in the first screen region is captured.

FIG. 11 is a conceptual view illustrating an embodiment in which the size of the second screen region 251b is changed when the execution screen of an application displayed in the first screen region 251a is captured.

referring to FIG. 11A, a bar 258 dividing the screen into the first and the second screen region 251a, 251b may be selected based on a touch to the display unit 151. For example, when the bar 258 is dragged in the direction of the second screen region 251b, the bar 258 may be moved in the direction of the second screen region 251b.

Accordingly, the size of the first screen region 251a may be increased, and at the same time the size of the second screen region 251b may be decreased. As a result, the amount of content displayed in the first screen region 251a may be increased, and at the same time the amount of content displayed in the second screen region 251b may be decreased.

On the other hand, though not shown in the drawing, when the bar 258 is dragged to the bottom end of the second screen region 251b, the first screen region 251a may be switched to an entire screen region of the display unit 151, and the second screen region 251b may be hidden.

As illustrated in FIG. 11A, the first screen region 251a may be displayed on the display unit 151 in a state that the size thereof is increased. At the same time, the second screen region 251b may be displayed on the display unit 151 in a state that the size thereof is decreased.

At this time, when a touch input is sensed on the icon 252 displayed in the first screen region 251a, referring to FIGS. 11B and 11C, the controller 180 may capture the execution screen of the Internet application, and append the captured image content 253 to the email input screen displayed in the second screen region 251b.

At this time, as illustrated in FIG. 11B, the captured image content 253 may be displayed to be overlapped with the first screen region 251a for a preset period of time. The controller 180 may provide an effect of moving the captured image content 253 from the first screen region 251a to the second screen region 251b. The controller 180 may change the size of the second screen region 251b for a preset period of time in connection with the captured image content 253 being moved from the first screen region 251a to the second screen region 251b. For example, the size of the second screen region 251b may be temporarily increased.

Then, as illustrated in FIG. 11C, the controller 180 may append the captured image content 253 to the email input screen. The controller 180 may display thumbnail image data 254 corresponding to the captured image content on the email input screen. Then, as illustrated in FIG. 11D, the controller 180 may restore the size of the increased second screen region 251b.

Figure 12:
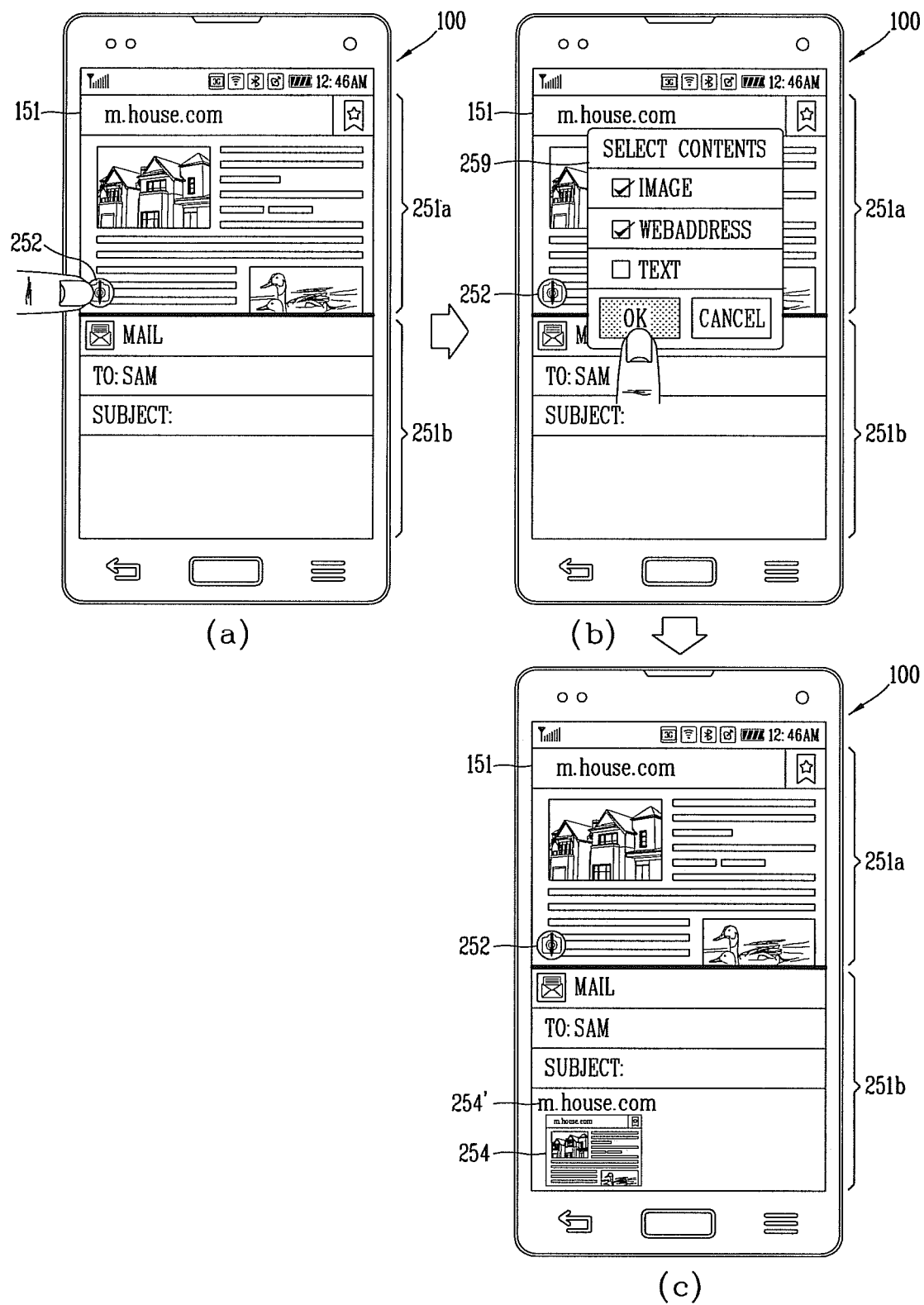
FIG. 12 is a conceptual view illustrating an embodiment in which additional information associated with the execution screen of an application displayed in the first screen region is appended to the execution screen of an application being executed in the second screen region.

FIG. 12 is a conceptual view illustrating an embodiment in which additional information associated with the execution screen of an application displayed in the first screen region 251a is appended to the execution screen of an application being executed in the second screen region 251b.

Referring to FIG. 12, the controller 180 may append additional information associated with the Internet application displayed in the first screen region 251a to the email input screen displayed in the second screen region 251b.

Referring to FIGS. 12A and 12B, when a touch input is sensed on the icon 252, the controller 180 may display a popup window 259 for selecting whether to append which one of the additional information. Here, the additional information may include at least one of image content that has captured the execution screen of the Internet application, webpage address and text information.

Then, when at least one item (for example, captured image content and webpage address) is selected from the popup window 259, referring to FIG. 12C, the controller 180 may append the captured image content and webpage address to the email input screen based on the selected item. Accordingly, thumbnail image data 254 corresponding to the captured image content and text data 254' corresponding to the webpage address may be displayed on the email input screen.

Figure 13:
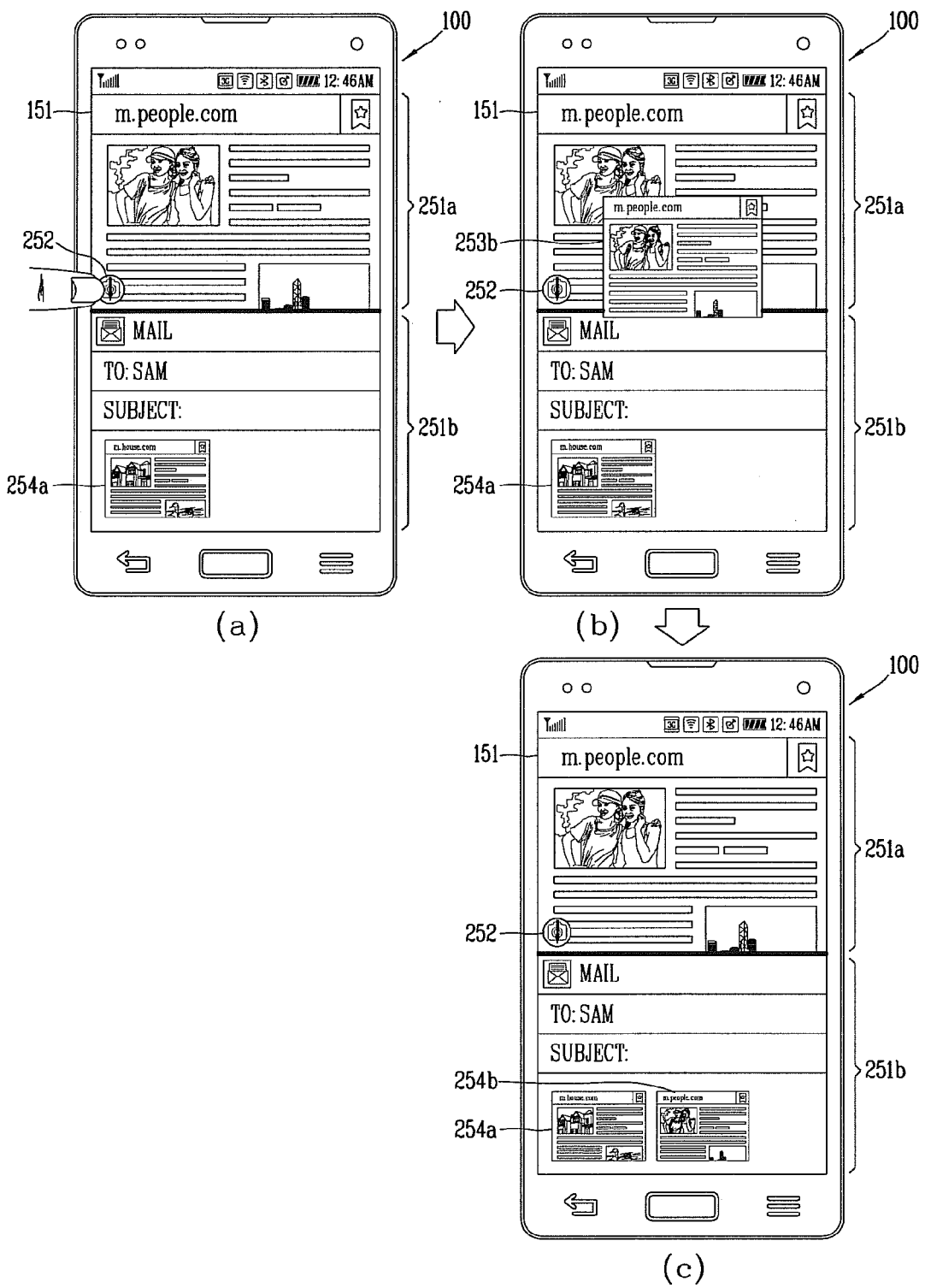
FIG. 13 is a conceptual view illustrating an embodiment in which a plurality of captured image contents are appended to the execution screen of an application being executed in the second screen region.

FIG. 13 is a conceptual view illustrating an embodiment in which a plurality of captured image contents are appended to the execution screen of an application being executed in the second screen region 251b.

As illustrated in FIG. 13A, when a touch input is sensed again on the icon 252 in a state that previously captured image content (hereinafter, referred to as "first image content") is appended to the email input screen displayed in the second screen region 251b, the controller 180 may recapture the execution screen of an application displayed in the first screen region 251a as illustrated in FIG. 13B.

Then, as illustrated in FIG. 13C, the controller 180 may append the recaptured image content (hereinafter, referred to as "second image content") to the email input screen. Accordingly, as illustrated in the drawing, first thumbnail image data 254a corresponding to the first image content and second thumbnail image data 154b corresponding to the second image content may be displayed on the email input screen.

Figure 14:
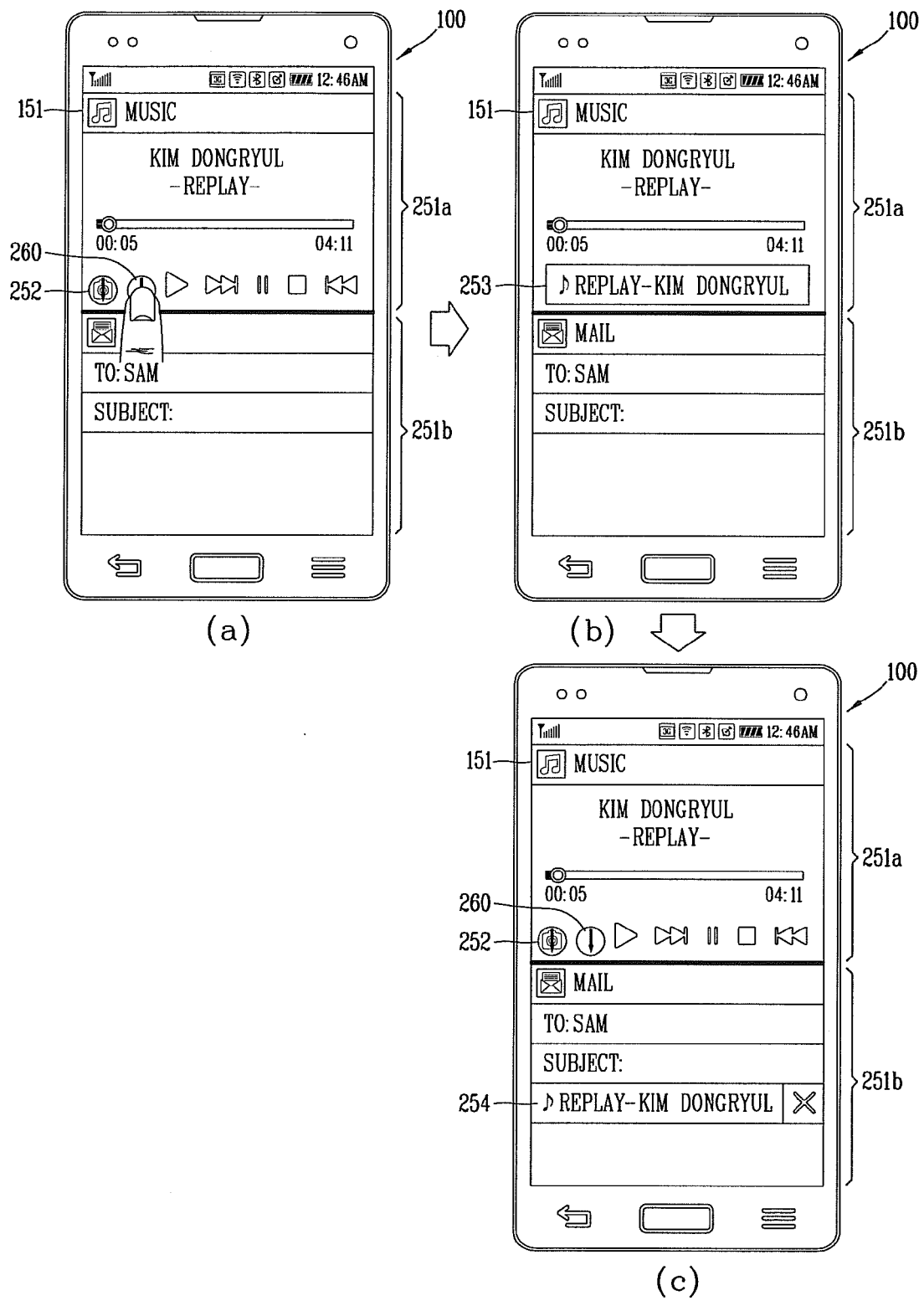
FIGS. 14 and 15 are conceptual views illustrating an embodiment in which a content file displayed in the first screen region is appended to the execution screen of an application being executed in the second screen region.
Figure 15:
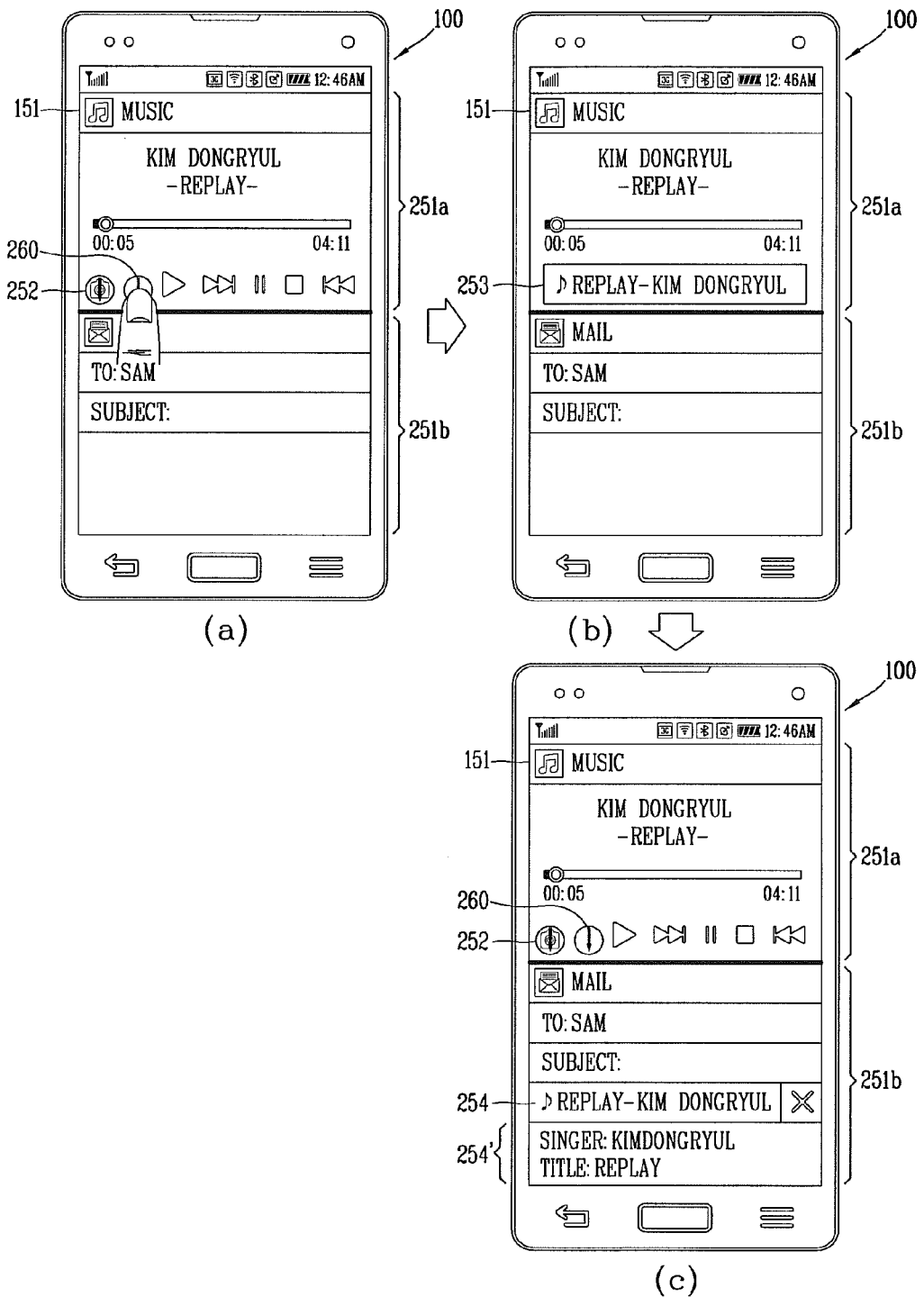

FIGS. 14 and 15 are conceptual views illustrating an embodiment in which a content file displayed in the first screen region 251a is appended to the execution screen of an application being executed in the second screen region 251b.

An icon displayed in the first screen region 251a may include a first icon 252 corresponding to a function of capturing the execution screen of an application displayed in the first screen region 251a and a second icon 260 corresponding to a function of transmitting a content file displayed in the first screen region 251a.

As described above, when a touch input is sensed on the first icon 252, the controller 180 may capture the execution screen of an application (for example, the execution screen of a music play application) displayed in the first screen region 251a.

On the other hand, referring to 14A, when a first touch input (for example, short touch input) is sensed on the second icon 260 displayed in the first screen region 251a, the controller 180 may append a content file (for example, music file) being executed in the first screen region 251a to the email input screen displayed in the second screen region 251b as illustrated in FIGS. 14B and 14C.

At this time, as illustrated in FIG. 14B, the controller 180 may provide an effect of moving a popup window 253 indicating a music file from the first screen region 251a to the second screen region 251b.

Then, as illustrated in FIG. 14C, the controller 180 may display an object 254 indicating that a music file has been appended to the email input screen. As illustrated in the drawing, an icon (for example, "X"-shaped icon) corresponding to a function of deleting the appended music file may be also displayed in a region adjacent to the object 254.

On the other hand, referring to FIG. 15A, when a second touch input (for example, long touch input) which is different from the first touch input is sensed on the second icon 260 displayed in the first screen region 251a, the controller 180 may append additional information associated with a music file to the email input screen displayed in the second screen region 251b along with the music file being executed in the first screen region 251a. For example, the additional information may include a singer name, a title name and the like associated with the music file as illustrated in FIGS. 15B and 15C.

Accordingly, as illustrated in FIG. 15C, an object 254 indicating that a music file has been appended and text data 254' corresponding to the singer name and title name associated with the music file may be displayed on the email input screen.

On the other hand, though not shown in the drawing, the controller 180 may display a popup window for selecting which one of the additional information is to be appended. The controller 180 may append only the additional information selected from the popup window to the email input screen.

Figure 16:
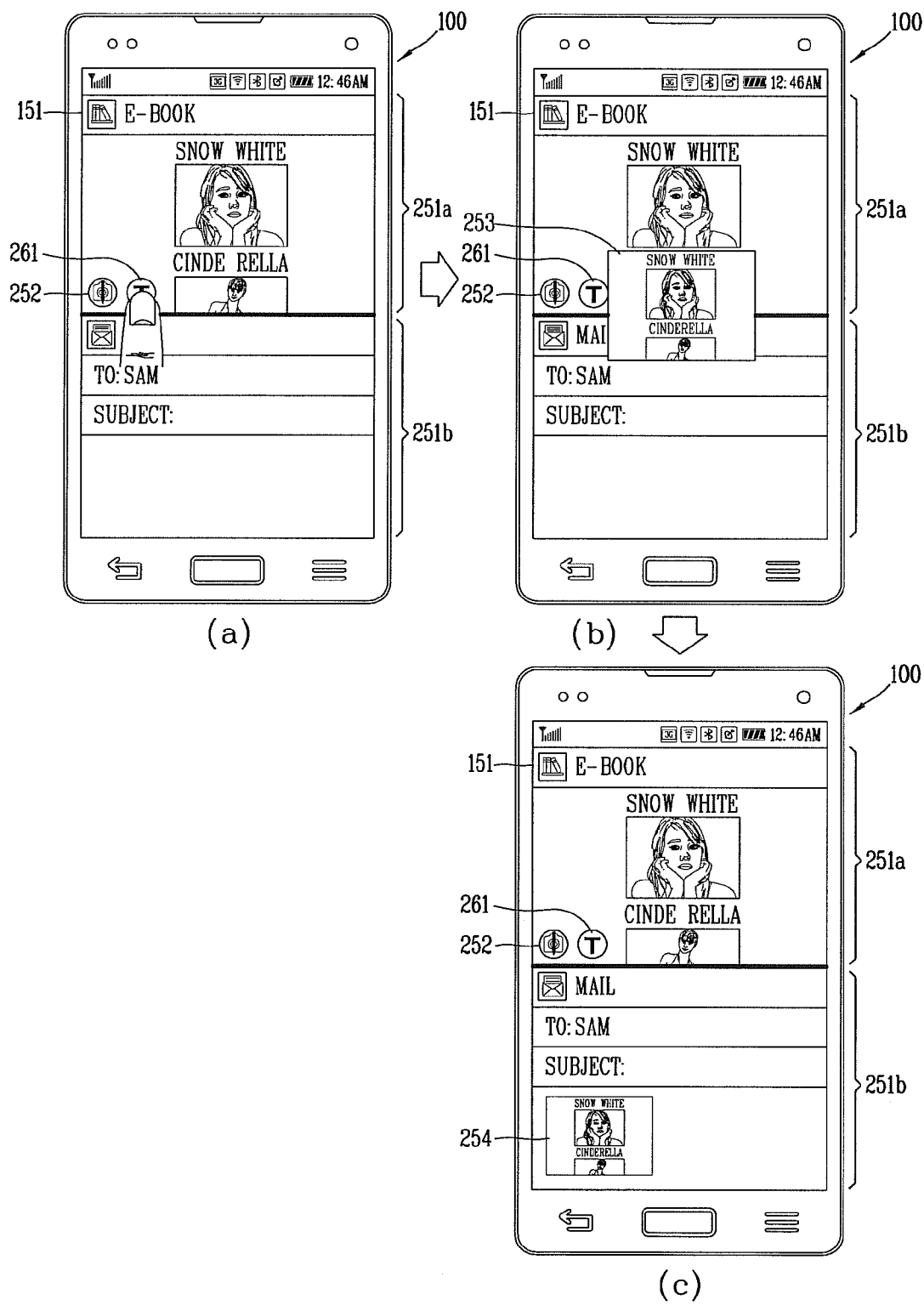
Figure 17:
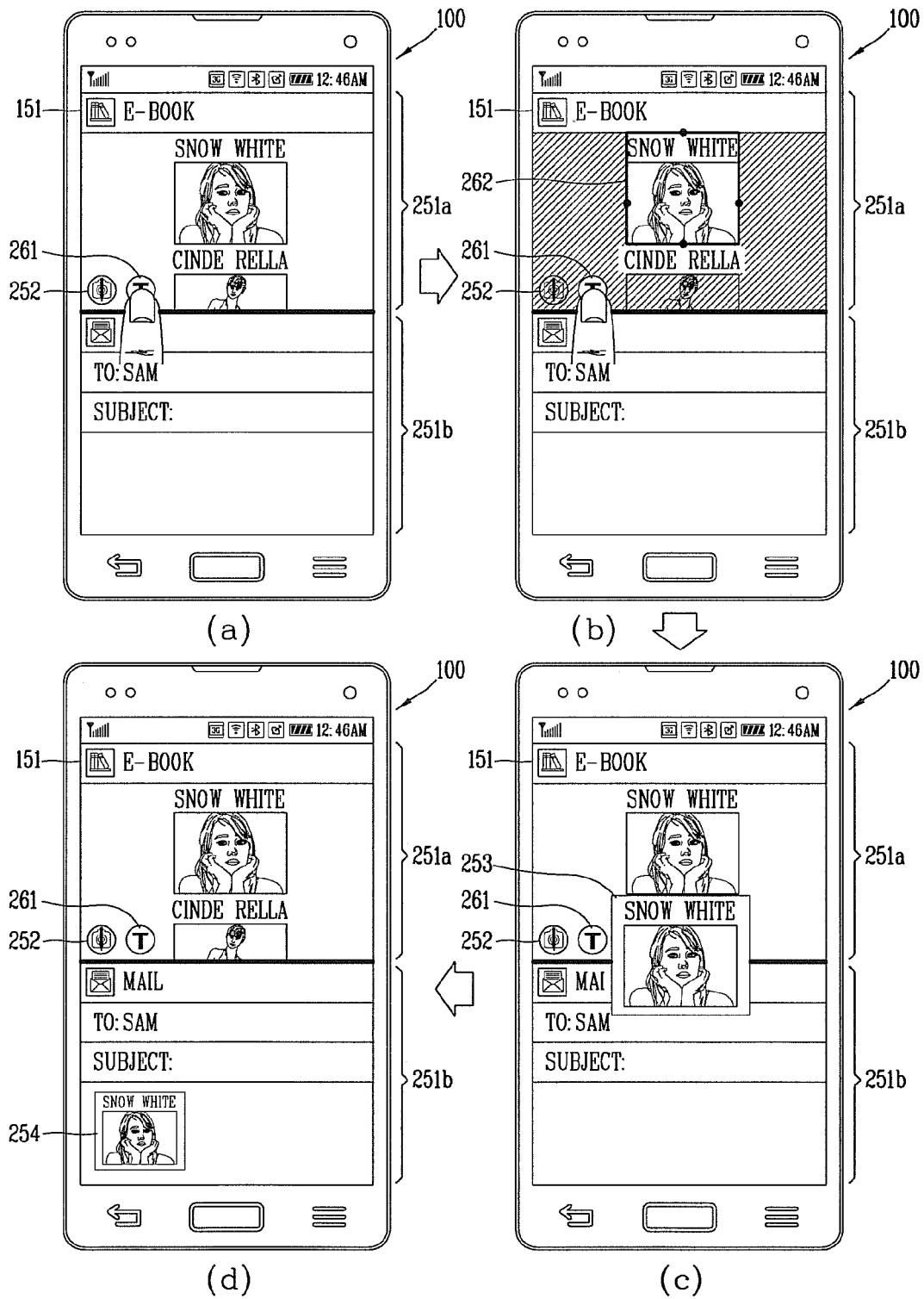

FIGS. 16 through 18 are conceptual views illustrating an embodiment in which text data displayed in the first screen region 251a is translated and appended to the execution screen of an application being executed in the second screen region 251b.

An icon displayed in the first screen region 251a may include a first icon 252 corresponding to a function of capturing the execution screen of an application displayed in the first screen region 251a and a third icon 261 corresponding to a function of translating text data displayed in the first screen region 251a. The third icon 261 may be displayed in the first screen region 251a only when the execution screen of an application containing text data is displayed in the first screen region 251a.

As described above, when a touch input is sensed on the first icon 252, the controller 180 may capture the execution screen of an application (for example, the execution screen of an ebook application) displayed in the first screen region 251a.

Furthermore, when a first touch input (for example, short touch input) is sensed on the third icon 261, the controller 180 may translate text data displayed in the first screen region 251a to a preset language or a language selected by the user, and display the translated text data to be reflected thereon.

Though an ebook application is illustrated as the application displayed in the first screen region 251a, the application displayed in the first screen region 251a may include a map application, an Internet application, and the like.

On the other hand, referring to FIG. 16A, when a second touch input (for example, long touch input) which is different from the first touch input is sensed on the third icon 261 displayed in the first screen region 251a, the controller 180 may translate text data displayed in the first screen region 251a, and capture the execution screen of an ebook application on which the translated text data is reflected, and append the captured image content 253 to the email input screen. Meanwhile, the controller 180 may append only the translated text data to the email input screen displayed in the second screen region 251b as illustrated in FIGS. 16B and 16C.

As illustrated in FIG. 16B the controller 180 may provide an effect of moving the image content 253 that has captured the translated text data from the first screen region 251a to the second screen region 251b.

Then, as illustrated in FIG. 16C, the controller 180 may display an object 254 indicating that image data that has captured the translated text data has been appended on the email input screen.

On the other hand, referring to FIG. 17A, when a second touch input (for example, long touch input) which is different from the first touch input is sensed on the third icon 261 displayed in the first screen region 251a, the controller 180 may display a regional boundary line 262 to select a region for performing a translation work on the execution screen of an ebook application displayed in the first screen region 251a as illustrated in FIG. 17B.

The controller 180 may adjust at least one of the location and size of a region for performing a translation work based on a touch input sensed on the regional boundary line 262. As illustrated in the drawing, a portion out of the regional boundary line 262 may be displayed to be distinguished from a portion within the regional boundary line 262 on the execution screen of the ebook application. For example, the portion out of the regional boundary line 262 may be displayed in a dim tone.

Then, when a touch input is sensed on the third icon 261, as illustrated in FIGS. 17C and 17D, the controller 180 may translate text data contained in the selected region, and capture the selected region on which the translated text data is reflected, and append the captured image content 253 to the email input screen. Meanwhile, the controller 180 may append only the translated text data to the email input screen displayed in the second screen region 251b.

Accordingly, as illustrated in FIG. 17D, the controller 180 may display an object 254 indicating that image data that has captured the translated text data has been appended on the email input screen.

On the other hand, referring to FIG. 18A, when a second touch input (for example, long touch input) which is different from the first touch input is sensed on the third icon 261 displayed in the first screen region 251a, the controller 180 may display a popup window 263 for selecting whether to immediately capture and append the execution screen of an ebook application displayed in the first screen region 251a, and otherwise whether to translate and then capture and append the execution screen of an ebook application as illustrated in FIG. 18B.

Then, when at least one item (for example, "original text") is selected from the popup window 263, the controller 180 may translate text data displayed in the first screen region 251a, and capture the execution screen of an ebook application on which the translated text data is reflected, and append the captured image content 253 to the email input screen as illustrated in FIGS. 18C and 18D.

Accordingly, as illustrated in FIG. 18D, the controller 180 may display an object 254 indicating that image data that has captured the translated text data has been appended on the email input screen.

According to the present disclosure, in a state that the display unit is divided into a first and a second screen region, either one of the first and the second screen region can be captured. Accordingly, even though the user captures screen information displayed in the entire region of the display unit and then he or she does not additionally edit the captured image, the user's desired region can be immediately captured. In other words, a complicated process for capturing a partial region of the screen information may be omitted. As a result, the user can more conveniently manage the resources of the mobile terminal such as memory, power, and the like, which are required to capture a partial region of the screen information.

According to an embodiment of present disclosure, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

An objective of the present disclosure is to provide a mobile terminal and control method thereof capable of capturing a partial region of screen information in a split screen state.

A mobile terminal according to an embodiment of the present disclosure may include a display unit formed to enable a touch input; and a controller configured to generate a plurality of screen regions dividing the display unit in which the display unit is divided into a plurality of screen regions, and determine whether or not to display an icon in a first screen region based on whether or not the execution screen of a preset application is displayed in a second screen region among the plurality of screen regions, wherein the icon is an icon corresponding to a function of controlling the execution screen of the preset application displayed in the second screen region using the execution screen of an application displayed in the first screen region. The plurality of screen regions may be generated based on an input, for example, a touch input on the touch screen, a designated button or the like. Moreover, the plurality of screen regions may be generated when operating in a split screen mode (or split mode).

According to an embodiment, the preset application may include an application capable of performing a function of appending content.

According to an embodiment, the icon may include a first icon corresponding to a function of capturing the execution screen of an application displayed in the first screen region, and the controller may capture the execution screen of an application displayed in the first screen region, and append the captured image content to the execution screen of the preset application displayed in the second screen region when a touch input is sensed on the first icon.

According to an embodiment, the controller may append additional information associated with the execution screen of the application displayed in the first screen region to the execution screen of the preset application displayed in the second screen region.

According to an embodiment, the controller may display a popup window capable of selecting which one of the additional information is to be appended on the display unit.

According to an embodiment, when the execution screen of an application displayed in the first screen region is captured, the display unit may display the captured image content to be overlapped with the first screen region for a preset period of time, and the controller may provide an effect of moving the captured image content from the first screen region to the second screen region.

According to an embodiment, when the size of the second screen region corresponds to a preset size, the controller may change the size of the second screen region for a preset period of time in connection with the captured image content being moved from the first screen region to the second screen region.

According to an embodiment, the controller may control the display unit to display a content input screen capable of immediately performing a function of appending the captured image content to the second screen region.

According to an embodiment, the controller may display an object indicating that the captured image content has been appended to the input screen.

According to an embodiment, the object indicating that the captured image content has been appended may include at least one of thumbnail image data corresponding to the captured image content and text data informing that the captured image content has been appended.

According to an embodiment, when a touch input is sensed again on the first icon, the controller may capture the execution screen of an application displayed in the first screen region again, and append the recaptured image content to the input screen displayed in the second screen region along with the previously captured image content.

According to an embodiment, the controller may capture the execution screen of an application displayed in the first screen region when a first touch input is sensed on the first icon, and capture an entire page containing the execution screen of the application displayed in the first screen region when a second touch input which is different from the first touch input is sensed on the first icon.

According to an embodiment, the controller may capture the execution screen of an application displayed in the first screen region when a first touch input is sensed on the first icon, and capture the execution screen of an application displayed in the first screen region, and execute an edit mode for editing the captured image content when a second touch input which is different from the first touch input is sensed on the first icon.

According to an embodiment, the controller may append the edited image content to the execution screen of the preset application displayed in the second screen region based on a touch input to the first icon after executing the edit mode.

According to an embodiment, the icon may further include a second icon corresponding to a function of transmitting a content file being executed in the first screen region, and the controller may append a content file being executed in the first screen region to the execution screen of the preset application displayed in the second screen region when a touch input is sensed on the second icon.

According to an embodiment, the icon may further include a third icon corresponding to a function of translating text data displayed in the first screen region, and the controller may translate text data displayed in the first screen region, and append the translated text data to the execution screen of the preset application displayed in the second screen region when a touch input is sensed on the third icon.

According to an embodiment, the controller may display a popup window for selecting which one of text data prior to translation and text data subsequent to translation is to be appended on the display unit.

A mobile terminal according to another embodiment of the present disclosure may include a display unit formed to enable a touch input; and a controller configured to generate a plurality of screen regions dividing the display unit in which the display unit is divided into a plurality of screen regions, and display an icon corresponding to a function of capturing the execution screen of a first application displayed in the first screen region in the first screen region among the plurality of screen regions, and display the execution screen of a second application capable of performing a function of appending content in the second screen region, wherein the controller captures the execution screen of the first application, and appends the captured image content to the execution screen of the second application when the icon is selected. The plurality of screen regions may be generated based on an input, for example, a touch input on the touch screen, a designated button or the like. Moreover, the plurality of screen regions may be generated when operating in a split screen mode (or split mode).

An embodiment of the present disclosure relates to a control method of a mobile terminal comprising a display unit formed to enable a touch input. The control method of the mobile terminal may include generating a plurality of screen regions dividing the display unit in which the display unit is divided into a plurality of screen regions; and determining whether or not to display an icon in a first screen region based on whether or not the execution screen of a preset application is displayed in a second screen region among the plurality of screen regions, wherein the icon is an icon corresponding to a function of controlling the execution screen of the preset application displayed in the second screen region using the execution screen of an application displayed in the first screen region. The generating the plurality of screen regions may be performed based on an input, for example, a touch input on the touch screen, a designated button or the like. Moreover, the generating step may be performed to generate the plurality of screen regions when operating in a split screen mode (or split mode).

Another embodiment of the present disclosure relates to a control method of a mobile terminal comprising a display unit formed to enable a touch input. the control method of the mobile terminal may include generating a plurality of screen regions dividing the display unit in which the display unit is divided into a plurality of screen regions; displaying an icon corresponding to a function of capturing the execution screen of a first application displayed in the first screen region in the first screen region among the plurality of screen regions, and displaying the execution screen of a second application capable of performing a function of appending content in the second screen region; and capturing the execution screen of the first application, and appending the captured image content to the execution screen of the second application when the icon is selected. The generating the plurality of screen regions may be performed based on an input, for example, a touch input on the touch screen, a designated button or the like. Moreover, the generating step may be performed to generate the plurality of screen regions when operating in a split screen mode (or split mode).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a touch screen configured to receive a touch input; and
a controller configured to control the touch screen, wherein
the touch screen is divided into a plurality of regions in response to an input to display execution screens for a plurality of applications, wherein a first execution screen for a first application is displayed in a first region and a second execution screen for a second application is displayed in a second region,
an icon is displayed in the first region based on a type of the second application displayed in the second region, the icon configured to access a function to capture and append content from the first application in the second application,
in response to the touch input at the icon, the content from the first application is captured and appended to content in the second application, and
when a size of the second region corresponds to a prescribed size, the size of the second region is changed for a prescribed period of time while the captured content is moved from the first region to the second region.

2. The mobile terminal of claim 1, wherein the type of the second application is a type of application capable of appending content to a message.

3. The mobile terminal of claim 2, wherein the second application is at least one of an email application or a messaging application.

4. The mobile terminal of claim 1, wherein, in response to the touch input at the icon, an image is captured from the first execution screen, the captured image being appended to the content in the second application.

5. The mobile terminal of claim 4, wherein additional information associated with the captured image is appended to the content in the second application.

6. The mobile terminal of claim 5, wherein a popup window for selecting the additional information to be appended is displayed on the touch screen.

7. The mobile terminal of claim 4, wherein, when the image of the first execution screen of the first application is captured, the captured image is displayed to overlap the first execution screen in the first region, then moved on the touch screen into the second execution screen in the second region, a graphical effect being provided to show movement of the captured image from the first execution screen to the second execution screen.

8. The mobile terminal of claim 7, wherein the touch screen is controlled to display a content input screen for appending the captured image to the content in the second application.

9. The mobile terminal of claim 8, wherein an object is displayed to indicate that the captured image has been appended in the content input screen.

10. The mobile terminal of claim 9, wherein the object to indicate that the captured image content has been appended includes at least one of a thumbnail image or text corresponding to the captured image.

11. The mobile terminal of claim 8, wherein, when a second touch input is sensed on the icon, a second image of an execution screen of an application displayed in the first screen region is captured, and the second image is appended in the content input screen of the second application along with the previously captured image.

12. The mobile terminal of claim 4, wherein, when the touch input at the icon is a first type of input, the image captured is an image of the displayed execution screen, and when the touch input at the icon is a second type of input, the image captured is an image of an entire page associated with the content displayed in the first execution screen, the first and second types of input being different types of input.

13. The mobile terminal of claim 4, wherein, when the touch input at the icon is a first type of input, the image from the first execution screen is captured and appended to the content in the second application, and when the touch input at the first icon is a second type of input, the captured image is displayed for editing prior to appending to the content in the second application, the first and second types of inputs being different types of inputs.

14. The mobile terminal of claim 13, wherein the edited image is appended to the content in the second application displayed in the second region based on a subsequent touch input at the first icon after editing the image.

15. The mobile terminal of claim 1, wherein, in response to the touch input at the icon, a content file associated with multimedia content being executed by the first application is transferred to the second application, the content file being appended to the content in the second application.

16. The mobile terminal of claim 1, wherein, in response to the touch input at the icon, text displayed in the first screen region is captured, the captured text being appended to the content in the second application.

17. The mobile terminal of claim 16, wherein a popup window is displayed on the touch screen for selecting whether to translate the captured text to another language prior to appending the captured text in the second application.

18. The mobile terminal of claim 1, wherein the touch screen is divided into the plurality of regions to display execution screens for a plurality of applications in a split mode.

19. A mobile terminal, comprising:
a touch screen configured to receive a touch input; and
a controller configured to control the touch screen, wherein
the touch screen is divided into a plurality of screen regions to display execution screens for a plurality of applications, a first execution screen for a first application being displayed in a first region of the touch screen, an icon corresponding to a function to capture an image of the first execution screen being displayed in the first region, and a second execution screen for a second application being displayed in a second region of the touch screen,
wherein an image of the first execution screen for the first application is captured and the captured image is appended to content in the second execution screen for the second application when the icon is selected, and
wherein, when a size of the second region corresponds to a prescribed size, the size of the second region is changed for a prescribed period of time while the captured image is moved from the first region to the second region.

20. A method of controlling a mobile terminal having a touch screen, the method comprising:
dividing the touch screen into a plurality of regions in response to an input to display a plurality of execution screens for a plurality of applications, wherein a first execution screen for a first application is displayed in a first region and a second execution screen for a second application is displayed in a second region; and
determining whether the second application displayed in the second region is a prescribed type of application;

displaying an icon in the first region when the second application is determined to be the prescribed type of application, the icon configured to access a function to capture and append content from the first application in the second application; and
capturing and appending the content from the first application to content in the second application in response to the touch input at the icon,
wherein, when a size of the second region corresponds to a prescribed size, the size of the second region is changed for a prescribed period of time while the captured content is moved from the first region to the second region.

\* \* \* \* \*